(12) United States Patent
Yen et al.

(10) Patent No.: US 10,416,408 B2
(45) Date of Patent: Sep. 17, 2019

(54) PROJECTOR ASSEMBLING EQUIPMENT

(71) Applicant: HIMAX TECHNOLOGIES LIMITED, Tainan (TW)

(72) Inventors: Yu-Feng Yen, Tainan (TW); Yin-Dong Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/695,033

(22) Filed: Sep. 5, 2017

(65) Prior Publication Data
US 2019/0072740 A1 Mar. 7, 2019

(51) Int. Cl.
*G02B 7/02* (2006.01)
*G03B 21/14* (2006.01)
(Continued)

(52) U.S. Cl.
CPC ............. *G02B 7/021* (2013.01); *G02B 7/023* (2013.01); *G02B 27/62* (2013.01); *G03B 21/142* (2013.01);
(Continued)

(58) Field of Classification Search
CPC .......... G02B 7/02; G02B 7/021; G02B 7/022; G02B 7/025; G02B 7/026; G02B 7/023; G02B 7/003; G02B 7/04; G02B 13/001; G02B 7/08; G02B 23/2476; G02B 27/62; G02B 3/00; G02B 13/0045; G02B 3/0075; G02B 5/003; G02B 5/005; G02B 13/0035; G02B 13/004; G02B 13/18; G03B 5/04;
(Continued)

(56) References Cited

U.S. PATENT DOCUMENTS

| 2011/0051099 A1* | 3/2011 | Chen ..................... G03B 21/10 353/79 |
| 2011/0069198 A1* | 3/2011 | Ezawa ................... G02B 7/021 348/222.1 |

(Continued)

FOREIGN PATENT DOCUMENTS

| CN | 1740835 A | 3/2006 |
| CN | 1815303 A | 8/2006 |

(Continued)

*Primary Examiner* — Evan P Dzierzynski
*Assistant Examiner* — Sharrief I Broome
(74) *Attorney, Agent, or Firm* — Winston Hsu

(57) ABSTRACT

A projector assembling equipment includes a holder and at least one multi-axial adjusting device. The lens module or the light source module is disposed on the holder. The multi-axial adjusting device is connected with the holder to move the holder relative to a reference plane, and the reference plane is used to put the lens module or the light source module which is not held by the holder. The multi-axial adjusting device includes a three-axis adjusting mechanism, a rotary adjusting mechanism and a tilt adjusting mechanism. The three-axis adjusting mechanism is utilized to shift the holder at a first direction, a second direction and a third direction. The rotary adjusting mechanism is disposed on the three-axis adjusting mechanism to rotate the holder at a clockwise direction and a counterclockwise direction. The tilt adjusting mechanism is disposed on the three-axis adjusting mechanism to recline the holder relative to the reference plane.

7 Claims, 4 Drawing Sheets

(51) Int. Cl.
*G03B 21/20* (2006.01)
*G02B 27/62* (2006.01)
*G03B 21/00* (2006.01)

(52) U.S. Cl.
CPC ....... *G03B 21/145* (2013.01); *G03B 21/2006* (2013.01); *G03B 21/208* (2013.01); *G03B 21/005* (2013.01)

(58) Field of Classification Search
CPC ........ G03B 5/02; G03B 21/14; G03B 21/145; G03B 21/142; G03B 21/2006; G03B 21/208; G03B 21/005
See application file for complete search history.

(56) References Cited

U.S. PATENT DOCUMENTS

| | | | |
|---|---|---|---|
| 2013/0188197 A1* | 7/2013 | Inada | G01B 9/02041 356/499 |
| 2016/0018055 A1* | 1/2016 | Huang | F16M 13/027 248/125.7 |
| 2018/0088449 A1* | 3/2018 | Hatano | G03B 21/142 |

FOREIGN PATENT DOCUMENTS

| | | |
|---|---|---|
| TW | 518449 | 1/2003 |
| TW | 200935189 | 8/2009 |

* cited by examiner

PROJECTOR ASSEMBLING EQUIPMENT

BACKGROUND OF THE INVENTION

1. Field of the Invention

The present invention relates to a projector assembling equipment, and more particularly, to a projector assembling equipment capable of aligning a lens module with a light source module.

2. Description of the Prior Art

Please refer to FIG. 6. FIG. 6 is an exploded diagram of a lens module 50 and a fixer 52 in prior art. The fixer 52 has a sunken structure, and a thread portion 54 is formed on an inner wall of the sunken structure. For assembling the lens module 50 with the fixer 52, the lens module 50 is engaged with the thread portion 54 to go deep into the sunken structure, the lens module 50 is not only unable to be laterally shifted, but also cannot be tilted and rotated relative to the fixer 52, so that the lens module 50 is difficult to align with an external light source, which results in a blurred image.

SUMMARY OF THE INVENTION

The present invention provides a projector assembling equipment capable of aligning a lens module with a light source module for solving above drawbacks.

According to the claimed invention, a projector assembling equipment capable of aligning a lens module with a light source module is disclosed. The projector assembling equipment includes a holder and at least one multi-axial adjusting device. The lens module or the light source module is disposed on the holder. The multi-axial adjusting device is connected with the holder and adapted to move the holder relative to a reference plane, and the reference plane is used to put the lens module or the light source module which is not held by the holder. The multi-axial adjusting device includes a three-axis adjusting mechanism, a rotary adjusting mechanism and a tilt adjusting mechanism. The three-axis adjusting mechanism is utilized to shift the holder at a first direction, a second direction and a third direction, and the first direction, the second direction and the third direction are perpendicular to each other. The rotary adjusting mechanism is disposed on the three-axis adjusting mechanism and utilized to rotate the holder at a clockwise direction and a counterclockwise direction. The tilt adjusting mechanism is disposed on the three-axis adjusting mechanism and utilized to recline the holder relative to the reference plane.

The light source module can be disposed on a fixer (not shown in the figures) upon the reference plane via the multi-axial adjusting device, and the lens module is accordingly disposed on the multi-axial adjusting device to optically center on the light source module. As the lens module is disposed on the fixer upon the reference plane, the lens module has to be assembled with the multi-axial adjusting device for optical centering. The present invention can adjust various aspects of the holder, and the lens module can be rapidly and effectively centered on the light source module for preferred image performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
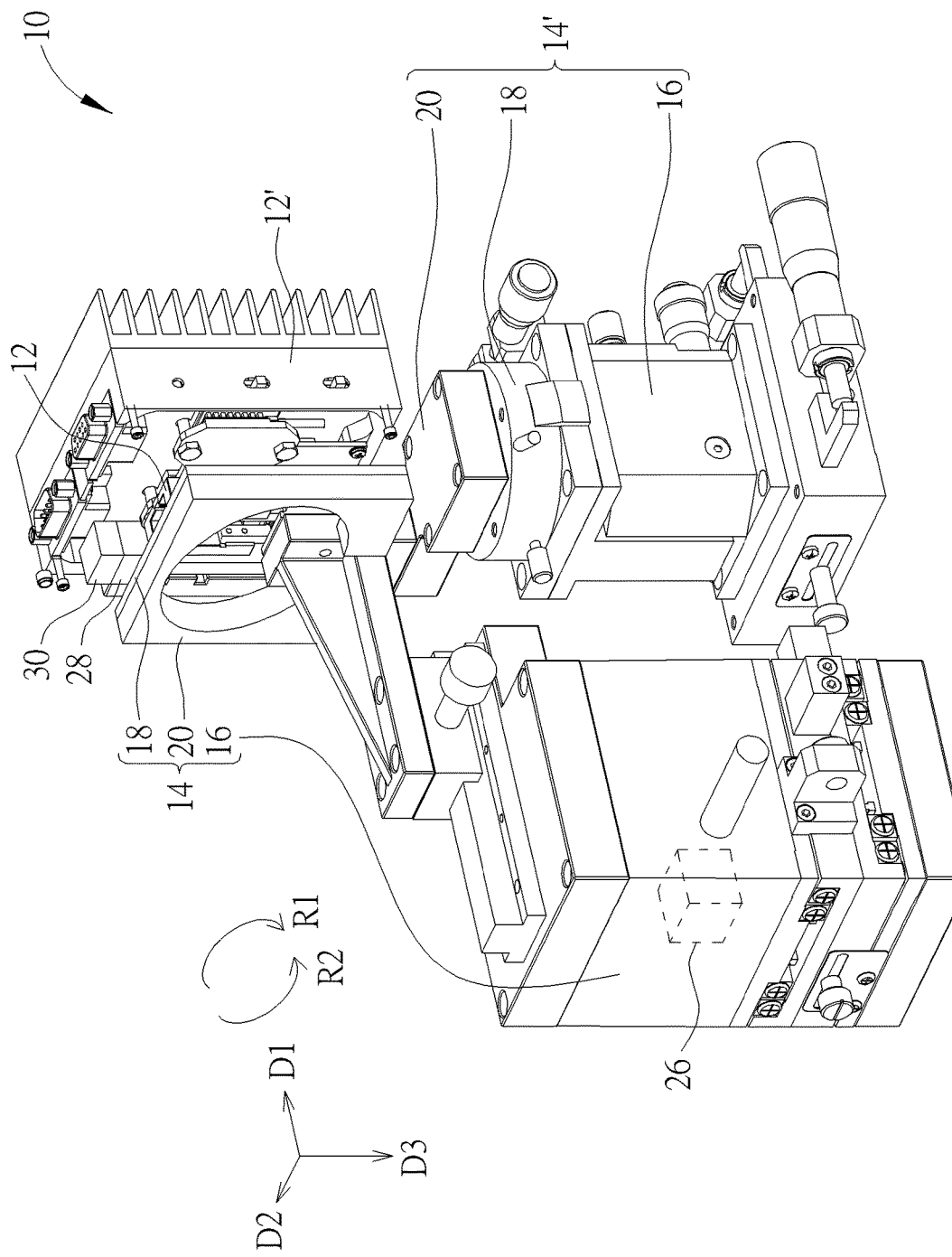
FIG. 1 is a diagram of a projector assembling equipment according to an embodiment of the present invention.
Figure 2:
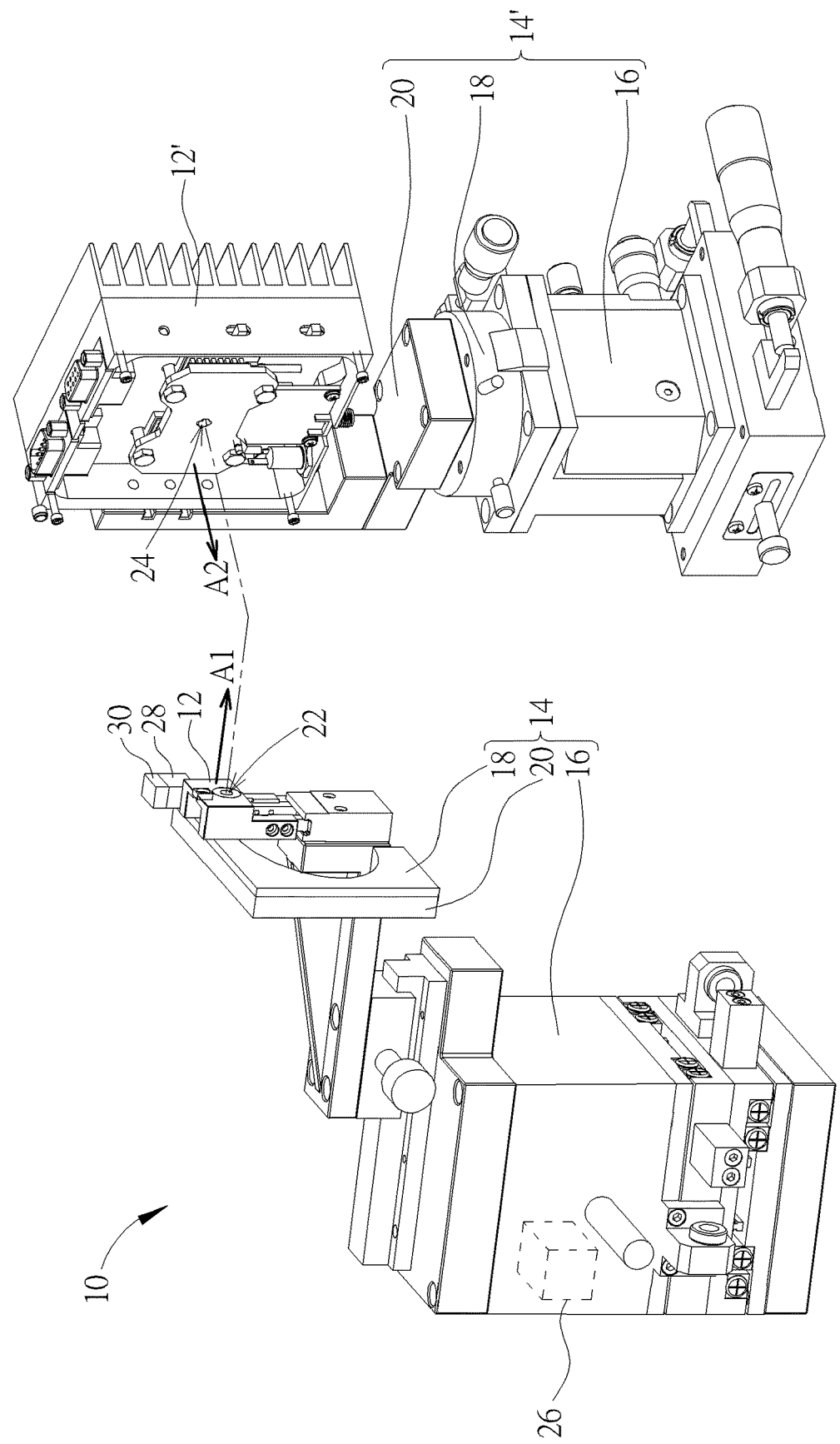
FIG. 2 is a diagram of a projector assembling equipment in another view according to the embodiment of the present invention.

Please refer to FIG. 1 and FIG. 2. FIG. 1 is a diagram of a projector assembling equipment 10 according to an embodiment of the present invention. FIG. 2 is a diagram of a projector assembling equipment 10 in another view according to the embodiment of the present invention. The projector assembling equipment 10 includes a holder 12 and at least one multi-axial adjusting device 14 connected with each other. The holder 12 is utilized to clip a workpiece, such as a lens module or a light source module. The multi-axial adjusting device 14 includes a three-axis adjusting mechanism 16, a rotary adjusting mechanism 18 and a tilt adjusting mechanism 20 stacked with each other, so as to move the holder 12 relative to a reference plane. While the lens module is assembled with the holder 12, the light source module is held on the reference plane optionally via a fixer 12' of another multi-axial adjusting device; further, the lens module may be fixed on the reference plane, and the light source module is assembled with the holder 12 of the multi-axial adjusting device 14.

Figure 3:
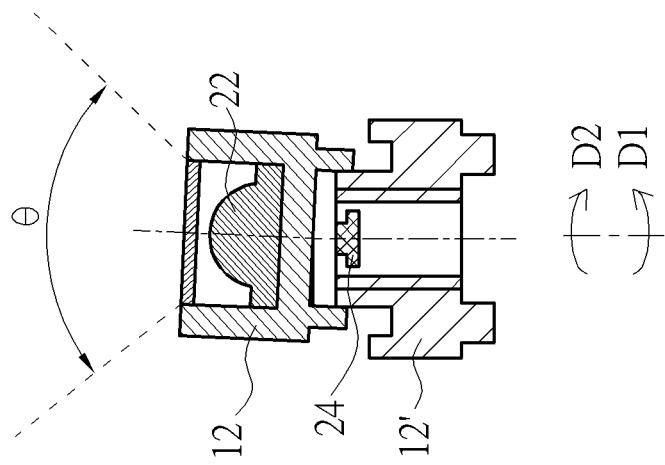
FIG. 3 to FIG. 5 respectively are diagrams of the lens module and the light source module in different adjusting process according to the embodiment of the present invention.
Figure 4:
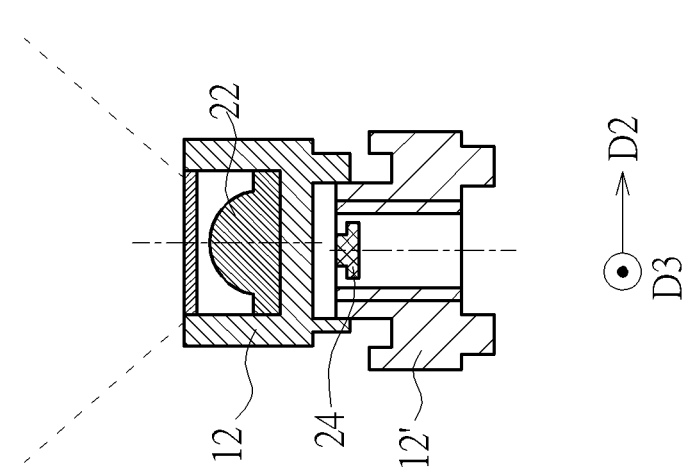
Figure 5:
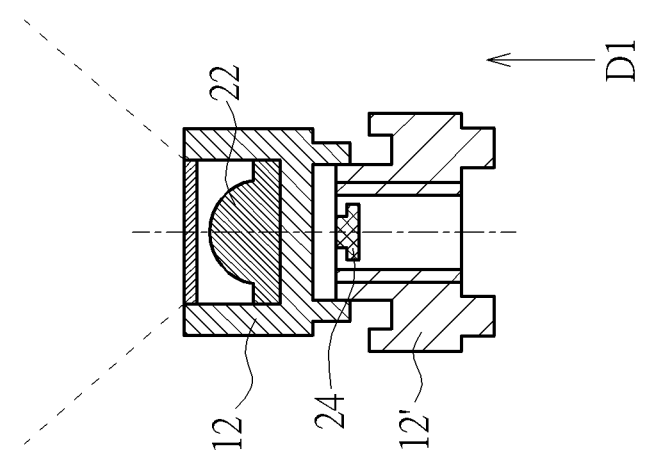
Figure 6:
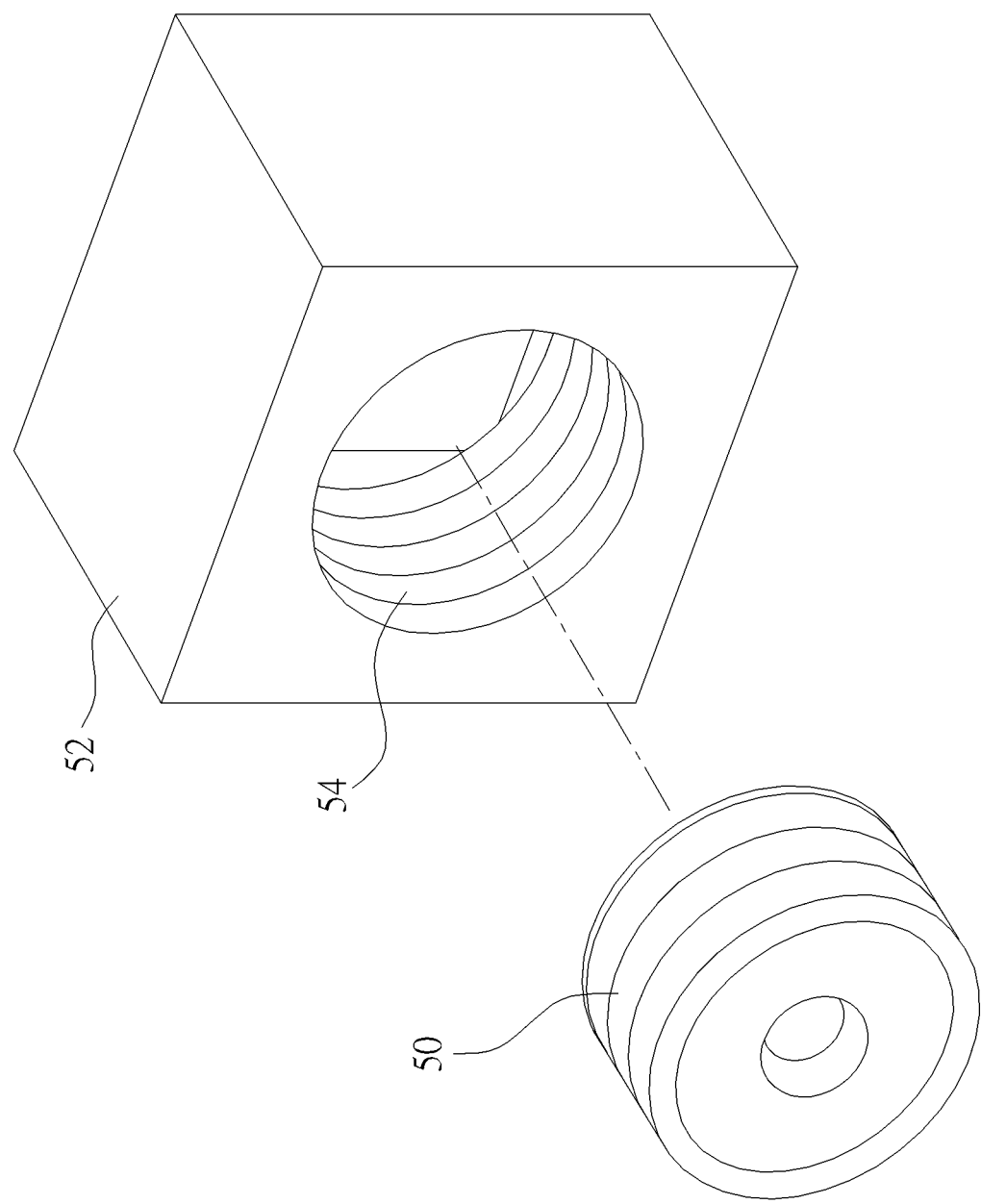
FIG. 6 is an exploded diagram of a lens module and a fixer in prior art.

Please refer to FIG. 1 to FIG. 5. FIG. 3 to FIG. 5 respectively are diagrams of the lens module 22 and the light source module 24 in different adjusting process according to the embodiment of the present invention. The three-axis adjusting mechanism 16 can be utilized to shift the holder 12 at a first direction D1, a second direction D2 and a third direction D3. The first direction D1 (such as Z axis), the second direction D2 (such as Y axis) and the third direction D3 (such as X axis) are perpendicular to each other. The rotary adjusting mechanism 18 can be utilized to rotate the holder 12 at a clockwise direction R1 and a counterclockwise direction R2, and the tilt adjusting mechanism 20 can be utilized to recline the holder 12 relative to the reference plane for adjusting an angle θ. The reference plane can be defined as a surface of another holder. Thus, the projector assembling equipment 10 is able to accurately align the lens module 22 with the light source module 24.

The multi-axial adjusting device 14 can be actuated in manual or by a driving device 26 electrically connected with the multi-axial adjusting device 14. As an example of automatic adjustment in the present invention, the driving device 26 can drive the multi-axial adjusting device 14 to shift the holder 12 at the first direction D1, for changing a distance between the holder 12 and the reference plane, as shown in FIG. 3. The driving device 26 further can drive the multi-axial adjusting device 14 to shift the holder 12 selectively at the second direction D2 and/or the third direction D3, so as to align a central axis A1 of the holder 12 with a reference axis A2 of the reference plane, as shown in FIG. 4. Final, the driving device 26 can drive the rotary adjusting mechanism 18 and/or the tilt adjusting mechanism 20 selectively to center the central axis A1 of the holder 12 on the reference axis A2 of the reference plane, as shown in FIG. 5. Fringe patterns on an image, which is projected by the light source module 24 via the lens module 22, can be altered toward suitable position by means of operation of the multi-axial adjusting device 14.

The projector assembling equipment 10 may further include a dispenser device 28 and a curing device 30 assembled with the holder 12. The dispenser device 28 is an optional equipment which is used to dispense adhesive onto the workpiece clipped on the holder 12, and the curing device 30 is another optional equipment matched with the dispenser device 28 and can be used to cure the adhesive for sticking the workpiece clipped on the holder 12 on another workpiece fixed onto the reference plane. For example, the adhesive can be UV (ultraviolet) adhesive, and the curing device 30 projects ultraviolet rays onto the workpiece to harden the UV adhesive.

In an operation process of the projector assembling equipment 10, the lens module 22 is preferably disposed on the holder 12 to be adjusted by the multi-axial adjusting device 14, and the light source module 24 is preferably disposed on the fixer 12' of the another multi-axial adjusting device 14'. The multi-axial adjusting device 14' is firstably actuated to collimate a beam emitted by the light source module 24 for initial calibration; then, the multi-axial adjusting device 14 is actuated to align the central axis A1 with the reference axis A2, which means an optical axis of the lens module 22 is aligned with an optical axis of the light source module 24. After that, the multi-axial adjusting device 14 is actuated to optionally move the holder 12 at the first direction D1, the second direction D2, the third direction D3, the clockwise direction R1, the counterclockwise direction R2 and/or rotation of the angle θ, to ensure that the lens module 22 is optically centered on the light source module 24.

It should be mentioned that the lens module 22 may be shrunk a predetermined interval relative to the light source module 24 while orientation adjustment of the multi-axial adjusting device 14 is completed, the predetermined interval is designed to compensate deformation of the hardened adhesive because the distance between the lens module 22 and the light source module 24 may be decreased while the adhesive is hardened. Next, the dispenser device 28 is driven to dispense the adhesive onto the lens module 22 and/or the light source module 24, the curing device 30 is actuated to cure the adhesive, the said reserved distance is recovered and the hardened adhesive can stably fix the lens module 22 with the light source module 24, for finishing assembly of the lens module 22 and the light source module 24.

In conclusion, the lens module and the light source module are not coaxial before assembly, the lens module has to be calibrated by distance adjustment, planar adjustment, rotary adjustment and reclined adjustment to prevent the blurred image resulted from deviation or declination of the optical axis. Therefore, the light source module can be disposed on the fixer upon the reference plane via the multi-axial adjusting device, and the lens module can be accordingly disposed on the multi-axial adjusting device to optically center on the light source module. As the lens module is disposed on the fixer upon the reference plane, the lens module can be assembled with the multi-axial adjusting device for optical centering. Comparing to prior art, the present invention adjusts various aspects of the holder, and the lens module can be rapidly and effectively centered on the light source module for preferred image performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector assembling equipment capable of aligning a lens module with a light source module, the projector assembling equipment comprising:
    a holder whereon the lens module is disposed;
    a fixer whereon the light source module is disposed, the fixer being located upon a reference plane; and
    two multi-axial adjusting devices respectively connected with the holder and the fixer and adapted to drive a relative movement between the holder and the fixer, each multi-axial adjusting device comprising:
        a three-axis adjusting mechanism utilized to shift the holder at a first direction, a second direction and a third direction, wherein the first direction, the second direction and the third direction are perpendicular to each other;
        a rotary adjusting mechanism disposed on the three-axis adjusting mechanism and utilized to rotate the holder at a clockwise direction and a counterclockwise direction; and
        a tilt adjusting mechanism disposed on the three-axis adjusting mechanism and utilized to recline the holder relative to the reference plane.

2. The projector assembling equipment of claim 1, further comprising:
    a driving device electrically connected with the multi-axial adjusting device, and adapted to drive the three-axis adjusting mechanism at the first direction for changing a distance between the holder and the reference plane.

3. The projector assembling equipment of claim 2, wherein the driving device further drives the three-axis adjusting mechanism at the second direction and/or the third direction selectively to align a central axis of the holder with a reference axis of the reference plane.

4. The projector assembling equipment of claim 2, wherein the driving device further drives the rotary adjusting mechanism and/or the tilt adjusting mechanism selectively to center a central axis of the holder on a reference axis of the reference plane.

5. The projector assembling equipment of claim 1, further comprising:
    a dispenser device assembled with the holder and adapted to dispense adhesive onto the lens module or the light source module.

6. The projector assembling equipment of claim 5, further comprising:
    a curing device assembled with the dispenser device and adapted to cure the adhesive for sticking the lens module and the light source module.

7. The projector assembling equipment of claim 1, wherein the multi-axial adjusting device is utilized to collimate a beam emitted by the light source module while the light source module is disposed on the holder.

* * * * *